United States Patent

Takahashi et al.

[11] Patent Number: 5,337,235
[45] Date of Patent: Aug. 9, 1994

[54] LOCOMOTION CONTROL SYSTEM FOR LEGGED MOBILED ROBOT

[75] Inventors: Hideo Takahashi; Ryutaro Yoshino, both of Saitama, Japan

[73] Assignee: Honda Giken Kogyo Kabushiki Kaisha, Tokyo, Japan

[21] Appl. No.: 29,451

[22] Filed: Mar. 11, 1993

[30] Foreign Application Priority Data

Mar. 12, 1992 [JP] Japan .................................. 4-088111
Mar. 12, 1992 [JP] Japan .................................. 4-088112

[51] Int. Cl.$^5$ ............................................. G05B 19/00
[52] U.S. Cl. ............................. 364/424.02; 364/463; 901/1; 180/8.1; 180/8.5; 395/80; 395/82; 395/84
[58] Field of Search ................. 364/424.02, 463; 395/80, 82, 84, 85, 88; 180/8.5, 8.6, 8.1; 901/1

[56] References Cited

U.S. PATENT DOCUMENTS

| | | | |
|---|---|---|---|
| 4,834,200 | 5/1989 | Kajita | 180/8.1 |
| 5,151,859 | 9/1992 | Yoshino et al. | 364/424.02 |
| 5,158,493 | 10/1992 | Morgrey | 446/355 |
| 5,159,988 | 11/1992 | Gomi et al. | 180/8.6 |
| 5,206,569 | 4/1993 | Ozawa | 318/568.12 |
| 5,252,901 | 10/1993 | Ozawa et al. | 318/568.12 |
| 5,255,753 | 10/1993 | Nishikawa et al. | 180/8.6 |

FOREIGN PATENT DOCUMENTS

| | | |
|---|---|---|
| 6297006 | 5/1987 | Japan . |
| 3184782 | 8/1991 | Japan . |
| 4122585 | 4/1992 | Japan . |
| 4122586 | 4/1992 | Japan . |

OTHER PUBLICATIONS

English language Abstracts of JP Applications listed above.
Publication "Legged Robots on Rough Terrain: Experiments in Adjusting Step Length", Jessica Hodgins—Computer Science Dpt. Carnegie-Mellon University (IEEE 1988).

Primary Examiner—Thomas G. Black
Assistant Examiner—Julie D. Day
Attorney, Agent, or Firm—Lyon & Lyon

[57] ABSTRACT

A system for controlling locomotion of a legged such as a biped walking robot having a body and two legs connected to the body. Positional walking data are preestablished in advance with respect to the robot's center of gravity, foot position and the like. First, a difference between the robot's center of gravity at time t (current time) and at time t+delta t (next time) defined in the walking data is calculated. From the difference, then, a positional correction amount of the robot's hip position, which is decisive for determining the robot's attitude, at the time t+delta t is determined, and the robot's attitude at the time is determined from the corrected hip position and the foot position or the like preestablished in the walking data. And based on the determined attitude at the time, target joints angles of the robot is calculated and the joints are driven to the determined target angles. Since the walking data are preestablished in terms of the positional information, locomotion can be modified as required during walking. In another embodiment, forces acting on the robot legs are detected to estimate the robot's center of gravity at the current time (time t). The estimated value is used to determine the difference to be used to determine hip position correction amount which is in turn used in the robot's attitude.

9 Claims, 22 Drawing Sheets

FIG. 6

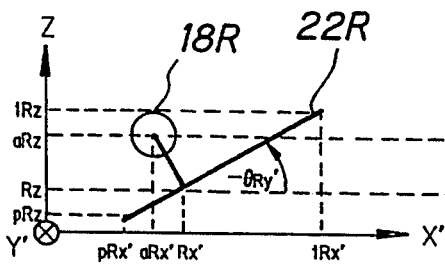

When walking data is for toe position
$$\begin{pmatrix} Rx' = tRx' - L_6 \cdot \cos(\theta Ry') \\ Rz = tRz + L_6 \cdot \cos(\theta Ry') \end{pmatrix}$$
$aRx' = Rx' + L_5 \cdot \sin\theta Ry'$
$aRy' = Ry' - L_5 \cdot \sin\theta Rx'$
$aRz = Rz + L_5 \cdot \cos\theta Ry' \cdot \cos\theta Rx'$

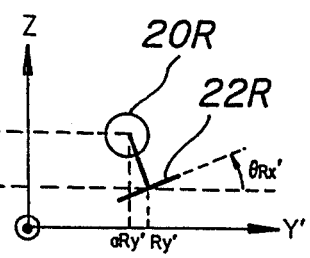

When walking data is for heel position
$$\begin{pmatrix} Rx' = pRx' + L_7 \cdot \cos(\theta Ry') \\ Rz = pRz - L_7 \cdot \cos(\theta Ry') \end{pmatrix}$$

FIG. 7

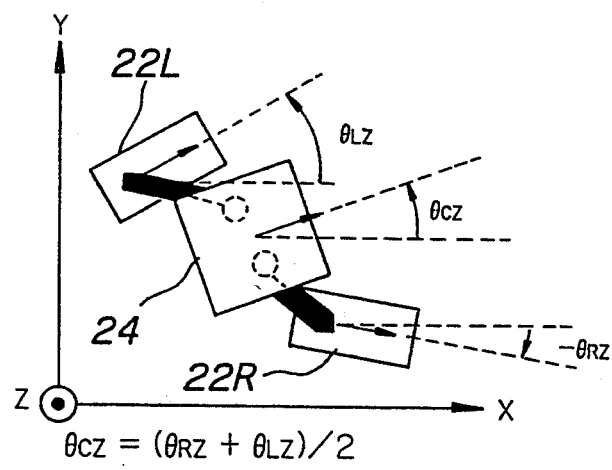

$\theta cz = (\theta Rz + \theta Lz)/2$

Joint angle R1z, L1z
$R1z = \theta Rz - \theta cz$
$L1z = \theta Lz - \theta cz$ $$\theta_{LIZ'} = \theta_{LIZ} + \Delta\theta z(t)$$

LOCOMOTION CONTROL SYSTEM FOR LEGGED MOBILED ROBOT

BACKGROUND OF THE INVENTION

1. Field of the Invention

This invention relates to a locomotion control system for a legged mobile robot, more particularly to such a system which enables a legged mobile robot which walks autonomously in accordance with a walking pattern based on predefined positional information to freely change its direction of advance or its stride or other aspects of its walking.

2. Description of the Prior Art

Among the techniques that have been developed for enabling stable locomotion by a legged mobile robot is one which calculates the walking pattern in real time (Legged Robots on Rough Terrain; Experiments in Adjusting Step Length, by Jessica Hodgins. IEEE, 1988). Such techniques cannot easily be applied for the control of a robot with multiple degrees of freedom, however, because such a robot is limited to the use of a compact, light computer too small to handle the huge amount of processing required. There have also been developed techniques for enabling walking by a legged mobile robot in which a walking pattern calculated in advance is stored in the memory of the robot's onboard computer and only simple data processing is conducted during walking. An example of a system based on this concept is taught by Japanese Laid-Open Patent Publication No. 62(1987)-97,006.

While this latter mentioned technique makes it possible to control a robot with multiple degrees of freedom using a computer that is compact and light enough to be carried by the robot, it restricts the robot's locomotion to that according to the predefined walking pattern and does not allow the robot to make real-time changes in path, direction of advance, stride, walking speed or other aspects of its locomotion in real time in the course of walking.

SUMMARY OF THE INVENTION

The object of this invention is therefore to provide a locomotion control system for a legged mobile robot which although using a compact, light-weight computer to control robot locomotion on the basis of a predesigned walking pattern also allows the robot to make real-time changes in various aspects of its locomotion when it is in the course of walking.

For realizing this object, the present invention provides a system for controlling locomotion of a legged walking robot having a body and a plurality of legs each connected to the body, comprising first means for preestablishing positional walking data in time series with respect to parameters at least including a n-th differential of the robot's center of gravity displacement, second means for determining a difference between the n-th differentials of the robot's center of gravity displacement at time t and at time t+delta t defined in the preestablished walking data, third means for determining a positional correction amount of the robot body at the time t+delta t in response to the determined difference, fourth means for determining an attitude of the robot at the time t+delta t at least on the basis of the corrected position of the robot body, fifth means for determining target angles of robot joints on the basis of the determined robot attitude and servo motor means for driving the robot joints in response to the determined target angles.

BRIEF DESCRIPTION OF THE DRAWINGS

The above and other objects and advantages of the invention will be more apparent from the following description and drawings, in which:

FIG. 6 is an explanatory view illustrating robot's foot position defined in the x-z and y-z planes;

FIG. 7 is an explanatory view illustrating orientations of the body and feet of the robot defined in the x-y plane;

FIG. 10 is an explanatory view illustrating the position or location of the hip and link length or the like;

DETAILED DESCRIPTION OF THE PREFERRED EMBODIMENTS

Embodiments of the invention will now be explained based on a biped walking robot as an example of a legged mobile robot.

Figure 1:
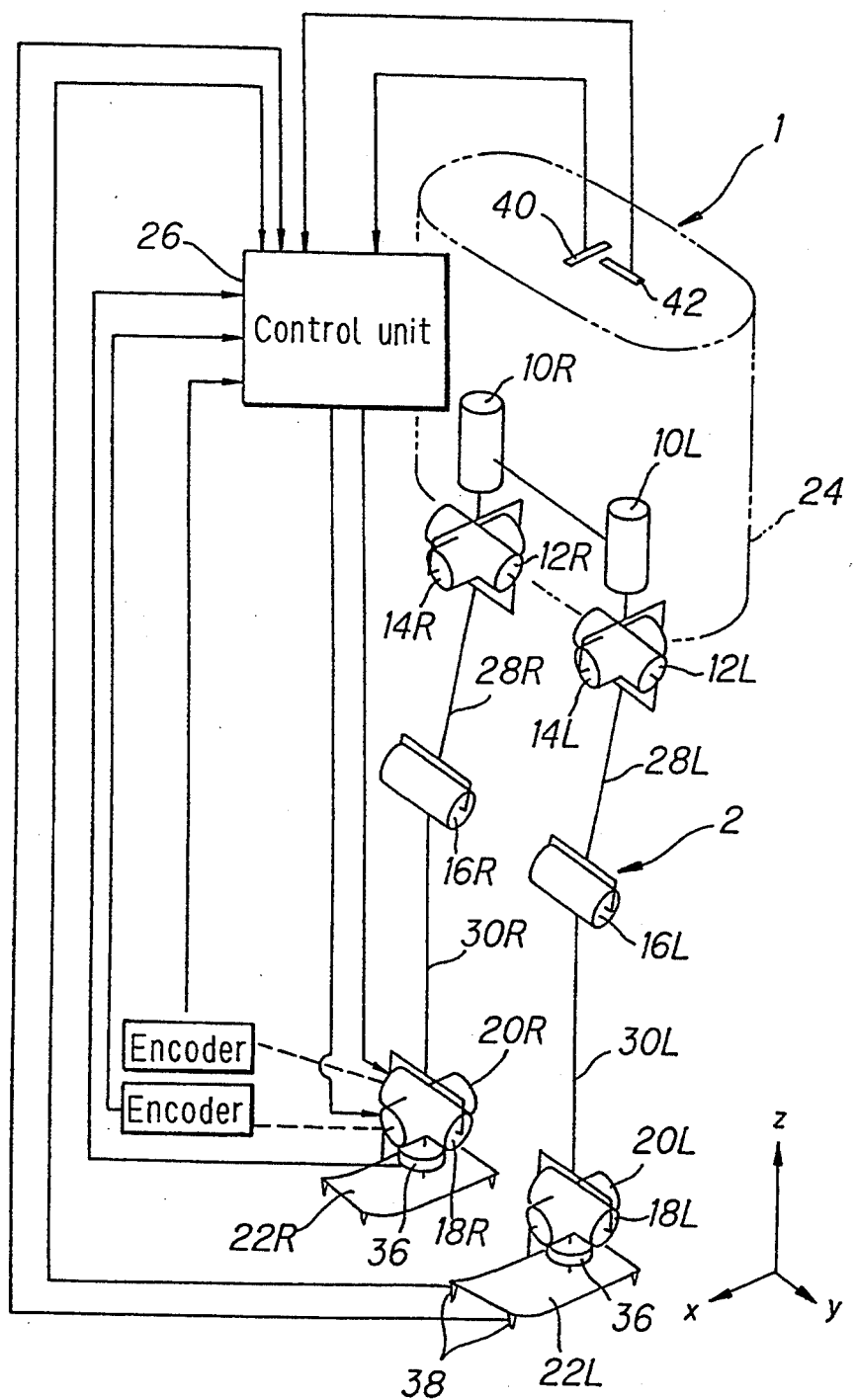
FIG. 1 is a schematic view showing the overall configuration of a locomotion control system for a legged mobile robot according to the invention.

An overall skeleton view of a biped robot 1 is shown in FIG. 1. The robot 1 has left and right legs each having six Joints (axes). (To make the arrangement easier to understand, the joints (axes) are represented as the electric motors by which they are driven. ) The six joints (axes) are, starting at the top, joints (axes) 10R, 10L for swiveling ( generally horizontal rotation ) of the legs at the hip (R and L indicating the right and left legs), joints (axes) 12R, 12L for rotation at the hip in the pitch direction (rotation about the y axis), joints (axes) 14R, 14L for rotation at the hip in the roll direction (rotation about the x axis), joints (axes) 16R, 16L for rotation at the knee in the pitch direction, joints (axes) 18R, 18L for rotation at the ankle in the pitch direction and joints (axes) 20R, 20L for rotation at the ankle in the roll direction. Foot members 22R, 22L are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 28R, 28L and the knee joints and ankle joints by crus links by 30R, 30L.

The leg links of the respective legs thus have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly by electric motors, as was mentioned earlier, and reduction gear mechanism for increasing motor torque. The structure of the Joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x,y and z force components Fx, Fy and Fz transmitted to the robot through the foot members and also measuring the moment component Mx, My and Mz around the three axes, the six-dimensional force and torque sensor 36 detects whether or not the associated foot member has landed and the magnitude and direction of the forces acting on the supporting leg. The sole of each foot member is equipped at its four corners with touch-down switches 38 of conventional design for detecting whether or not the foot is in contact with the ground. The top of the body 24 is provided with a pair of inclination sensors 40, 42 for detecting the robot's inclination angle and angular velocity relative to z axis in the x-z and y-z planes. Each electric motor at the individual joints is provided with a rotary encoder for generating rotational information. (In FIG. 1, only encoders associated with the right ankle joints are illustrated.) The outputs of the sensors 36 and the like are sent to the control unit 26 in the body.

Figure 2:
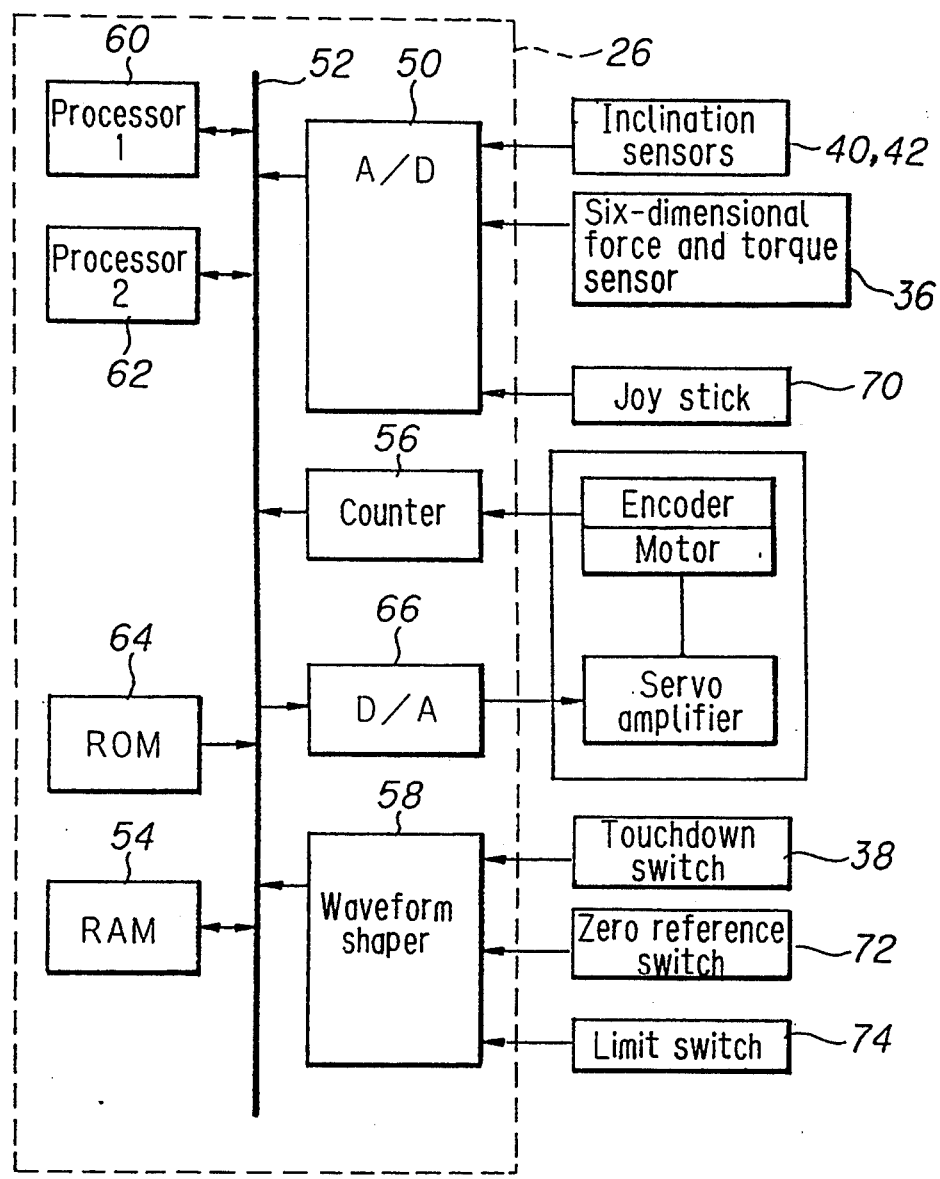
FIG. 2 is a block diagram showing the details of a control unit illustrated in FIG. 1.

As shown in the block diagram of FIG. 2, the control unit 26 has a microcomputer. The outputs from the inclination sensors 40, 42 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while the outputs of the touchdown switches 38 are stored in the RAM 54 via a wave-form shaper 58. The control unit has a first processor 60 and a second processor 62. The first processor 60 fetches a walking pattern from a ROM (read-only memory) 64 and computes target joint angles (or target link angles) while correcting them when the predesigned walking pattern or data is modified and outputs to the RAM 54 as will be explained later. (Here, the link angles mean absolute angles of the robot links with respect to the direction of gravity and the joint angles mean relative angles between the robot links.) The second processor 62 fetches the target joint angles (or target link angles) and measured angles from the RAM 54, computes control commands of the individual joint motors and sends the same to a servo amplifier thereof via a D/A converter 66. Moreover, in the figure, reference numeral 70 indicates a joy stick to be used to modify the walking pattern such as to change its direction of advance, stride or the like, reference numeral 72 zero reference switch for calibrating the inclination sensor's output and reference numeral 74 limit switch for preventing overruns.

The operation of the system will now be explained.

Figure 3:
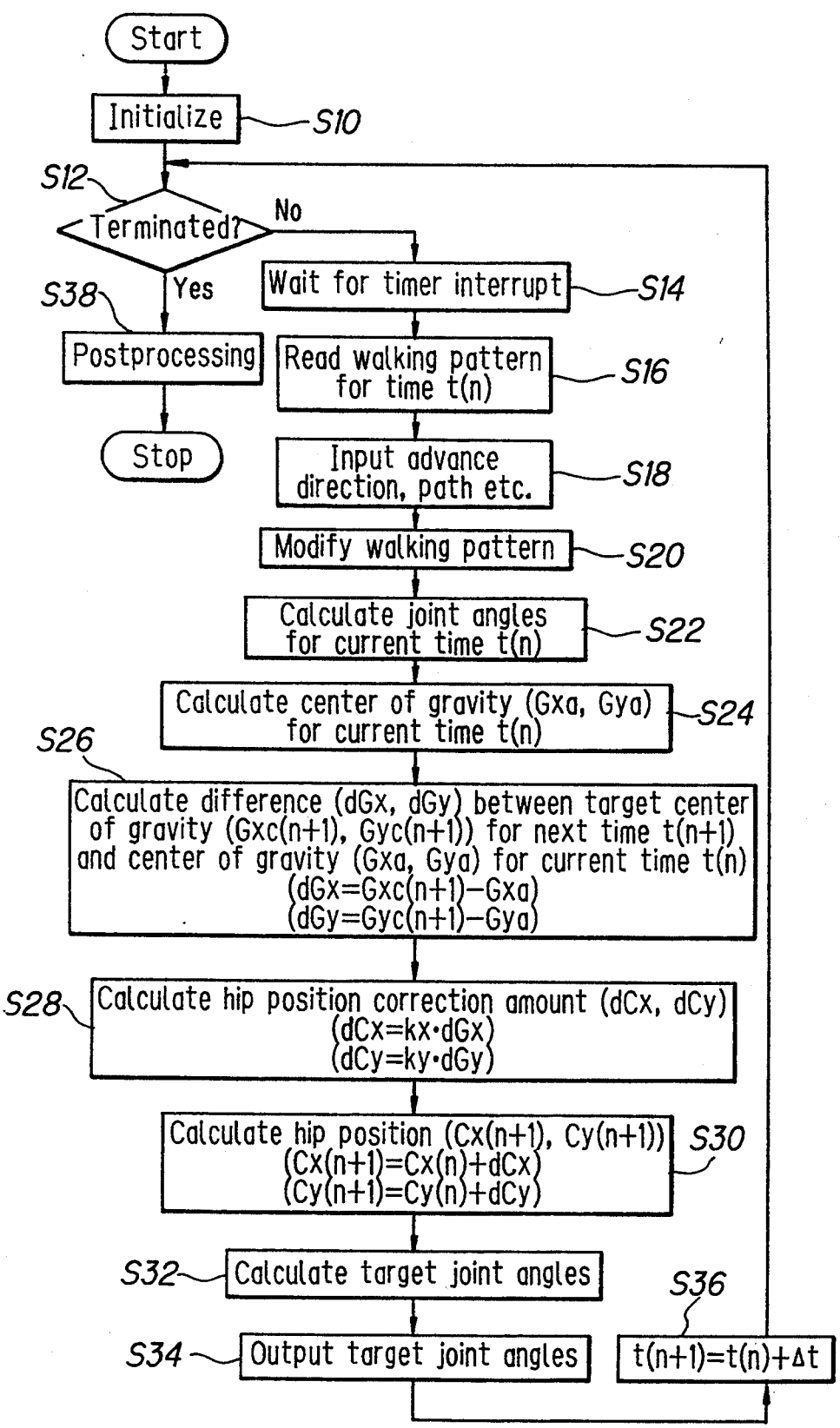
FIG. 3 is a flow chart showing the operation of the control system according to the invention.
Figure 4:
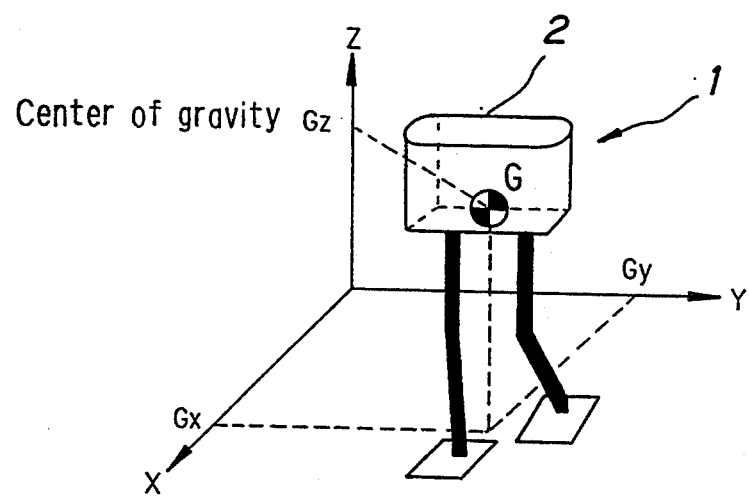
FIG. 4 is an explanatory view illustrating the position or location of robot's center of gravity in absolute coordinate space predefined in the walking patter or data referred to in the flow chart of FIG. 3.
Figure 5:
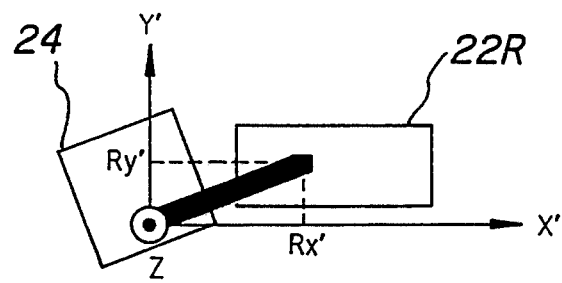
FIG. 5 is an explanatory view illustrating robot's foot position defined in the x-y plane and predefined in the walking pattern.
Figure 8:
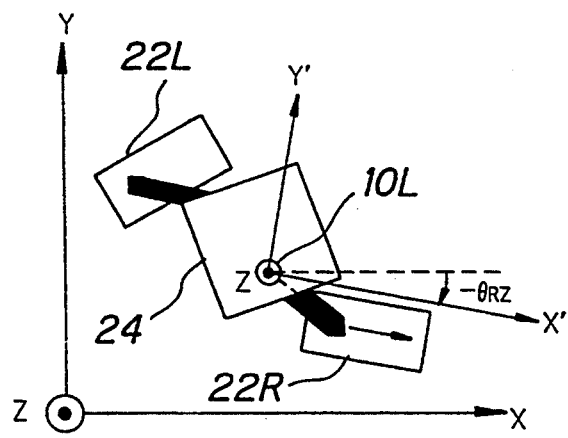
FIG. 8 is an explanatory view similar to FIG. 8.

FIG. 3 is a flow chart showing the operations executed by the first processor 60 for deciding the joint angle command values. The procedure begins with step S10 in which the overall system is initialized. Control then passes to step S12 in which a check is made as to whether or not locomotion has been terminated, and if it has not, to step S14 in which it waits for a timer interrupt. The interrupt occurs once every prescribed time period delta t, which is a period of, for example, 5 ms. When the timer interrupt occurs, control passes to step S16 in which the walking pattern or data for time t(n) is read. The walking pattern or data assumes straight-line walking and comprises of time series data or time functions defining position or location of the center of gravity, the position or location of the foot, orientation of the foot and inclination of the foot of the robot 1. As will be understood from FIG. 4, the robot's center of gravity position G is calculated in advance offline as values Gx, Gy, Gz on axes x, y and z in absolute coordinate space. The calculated values are stored in the ROM mentioned earlier. (To facilitate understanding of the invention, the value on the z axis will not be taken into consideration in this specification.) The positions Rx, Ry, Rz, Lx, Ly, Lz of the feet 22R, L are predefined in the x-y, x-z, y-z planes as shown in FIGS. 5 and 6. (The left side of FIG. 6 indicates the case where the walking data is for the toe position and the right side the case where it is for the heel position. The walking data or pattern defines the positions of the feet in the absolute coordinate space, and what is shown in FIGS. 5 and 6 are the coordinate-converted values for use in calculating the joint angles in the manner described later.) As shown in FIGS. 7 and 8, the foot orientations $\theta RZ$, $\theta LZ$ are defined on the x-y plane, and the foot inclinations $\theta RX$, $\theta RY$, $\theta LX$, $\theta LY$ are defined individually as shown in FIG. 6 etc.

Control then passes to step S18 in which the advance direction, path etc. may be input and to step S20 in which the walking pattern is modified (if changes have been made therein). (This will be explained later.) Control then passes to step S22 in which the joint angles at current time t(n), i.e. before the robot's hip has changed, are calculated.

The overall control is characterized in that, as was just explained, the walking pattern is not defined in terms of the joint angles or the link angles but in terms of superordinate concepts made up of positional information. Thus the joint angles and link angles are calculated instant by instant in the course of walking. In order to be able to calculate the same and decide the command values at any given instant, it is first necessary to define the robot's attitude. The biped walking robot which is the subject of this embodiment has a total of twelve degrees of freedom (total for two legs). Therefore, as regards the attitude, if the hip position, body orientation, body inclination, foot positions, foot orientations and foot inclinations are determined, it follows that the twelve parameters are determined with reference to the hip position. This is the necessary and sufficient condition for determining the joint and link angles. In this manner, the control according to the invention calculates the joint angles and the link angles in real time and then calculates the command values for the individual Joints.

Figure 10:
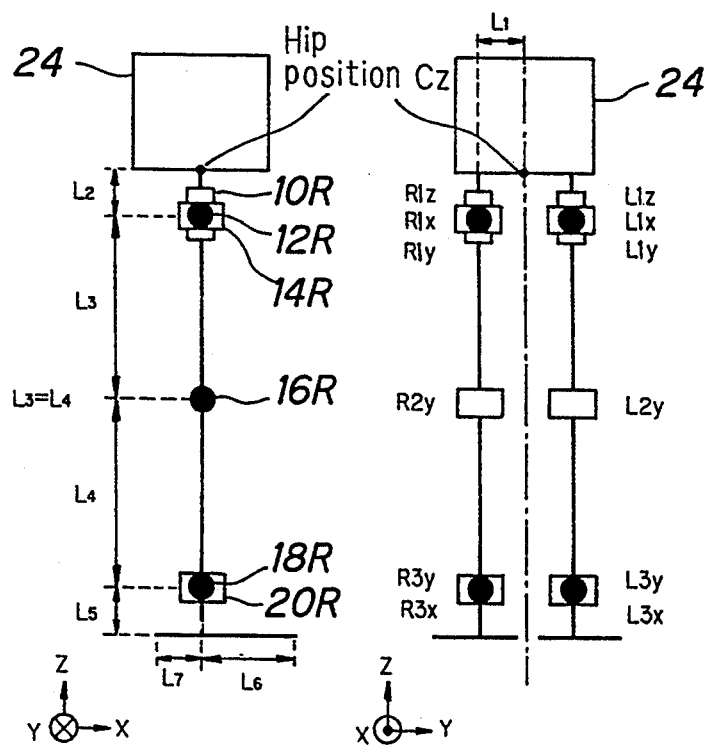
Figure 11:
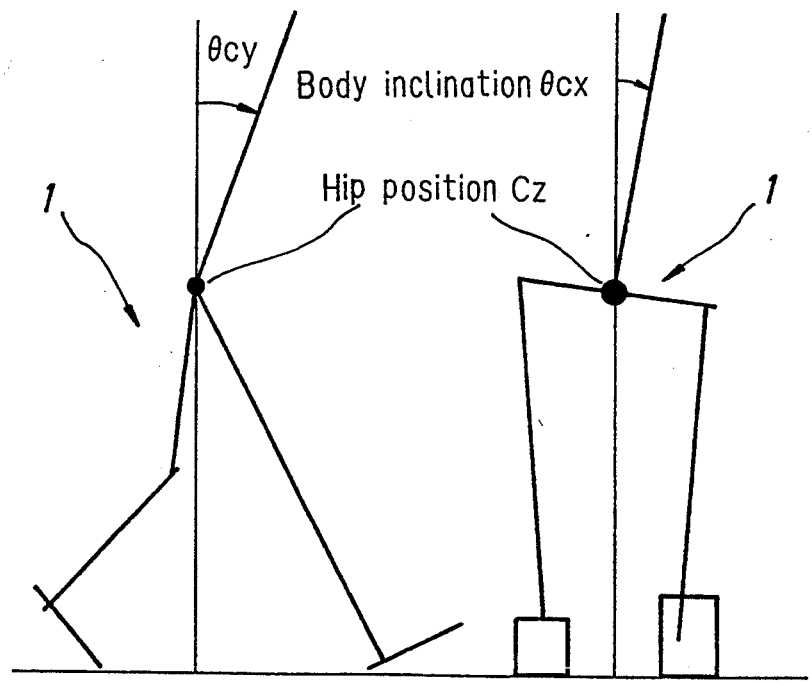
FIG. 11 is an explanatory view showing robot body's inclination and hip position.

As shown in FIG. 10, the hip position Cz is defined as an appropriate position between the hip joints (axes) 10R, L and the body 24. The symbols Ln in the same figure designate the lengths of the thigh links 28L, R and other links. Rnx, Rny, Rnz designate the joint angles on the right leg side and Lnx, Lny, Lnz the joint angles on the left leg side. As shown in FIG. 7, the body orientation $\theta CZ$ is defined as the average of the foot orientations $\theta RZ$, $\theta LZ$. The body inclinations $\theta CX$, $\theta CY$ can be detected from the values output by the inclination sensors 40, 42, as shown in FIG. 11. In determining the attitude angles, the left/right and fore/aft inclinations of the body are defined as zero. On the basis of the absolute angles of the body and the relative angles detected by the encoders on the leg link side, it is therefore also possible to position the leg link side with respect to the absolute coordinates. The position, orientation and inclination of the feet have been determined in the walking data or pattern.

Figure 9:
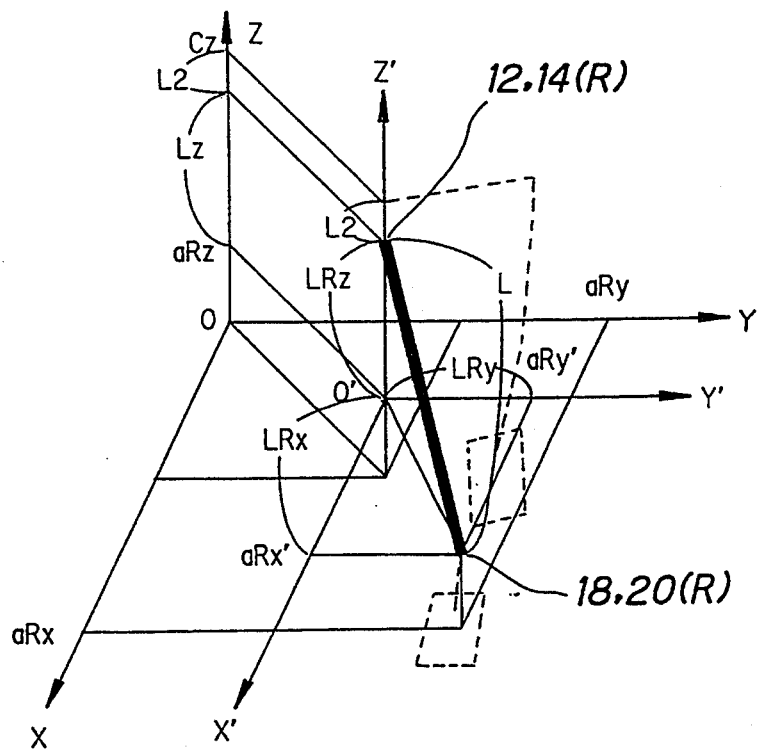
FIG. 9 is an explanatory view illustrating determination of the robot's hip position.
Figure 12:
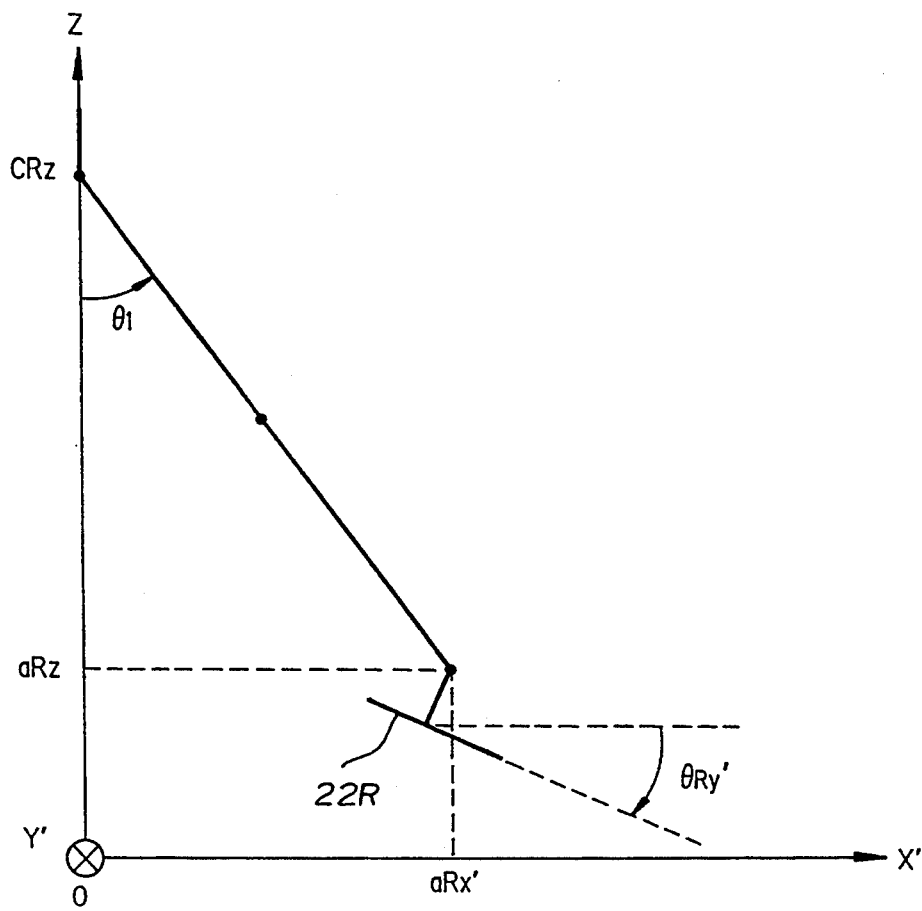
FIG. 12 is an explanatory view showing joint angle calculation in the x-z plane when the knee is straight.
Figure 13:
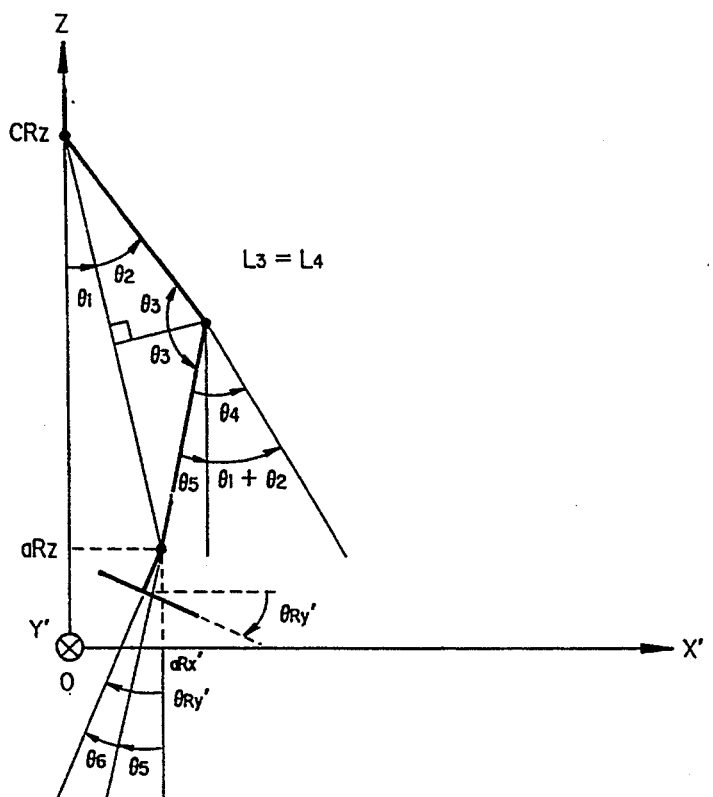
FIG. 13 is an explanatory view, similar to FIG. 12, but showing joint angle calculation in the same plane when the knee is bending.
Figure 14:
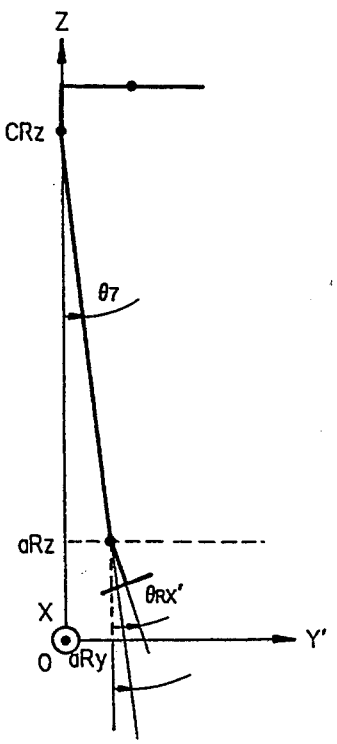
FIG. 14 is an explanatory view showing joint angle calculation in the y-z plane when the knee is straight.

Therefore, the parameters are determined and the joint angles at the current time t(n) are calculated in step S22. Examples of the calculations in the x-z and y-z planes are shown in FIG. 12 etc. As shown, the angles are calculated by a geometric method simultaneously with coordinate conversion. As can be seen, the hip position differs between the case where the knee is straightened (FIGS. 12 and 14) and the case where the knee is bent (FIG. 13). In this embodiment, therefore, the position of the hip in the vertical direction is determined with the knee(s) of one or both of the right and left legs straight. This will be explained with reference to FIG. 9. (Although the right leg is represented in FIG. 9 using x', y' z' coordinates, it is also possible to represent the left leg using x", y" z" coordinates.)

$L = L3 + L4$ (see FIG. 10)
$LRx = aRx'$
$LRy = aRy'$
$LLX = aLx''$
$LLy = aLy''$
$LRz^2 = L^2 - LRx^2 - LRy^2$
$LLz^2 = L^2 - LLx^2 - LLy^2$ Both knees are straight when:
$LRz = LLz$ $$Cz = aRz + LRz + L2 \\ = aLz + LLz + L2$$

The right knee is straight when:
$LRz < LLz$
$Cz = aRz + LRz + L2$
The left knee is straight when:
$LLz < LRz$
$Cz = aLz + LLz + L2$ In other words, since it can be considered that at least one of the knees will always be straight during walking, the position of the hip can determined by selecting and using one of the aforesaid conditions.

Figure 15:
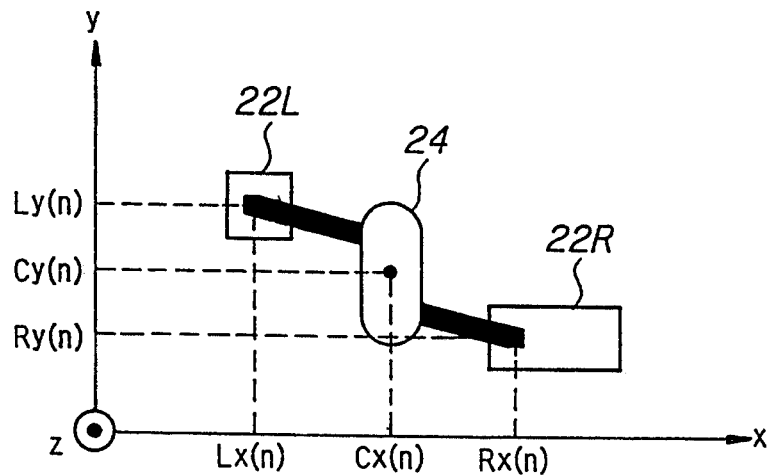
FIGS. 15 to 17 inclusive are explanatory views illustrating the movement of the robot's hip and the robot's center of gravity in the x-y plane over the course of time.
Figure 16:
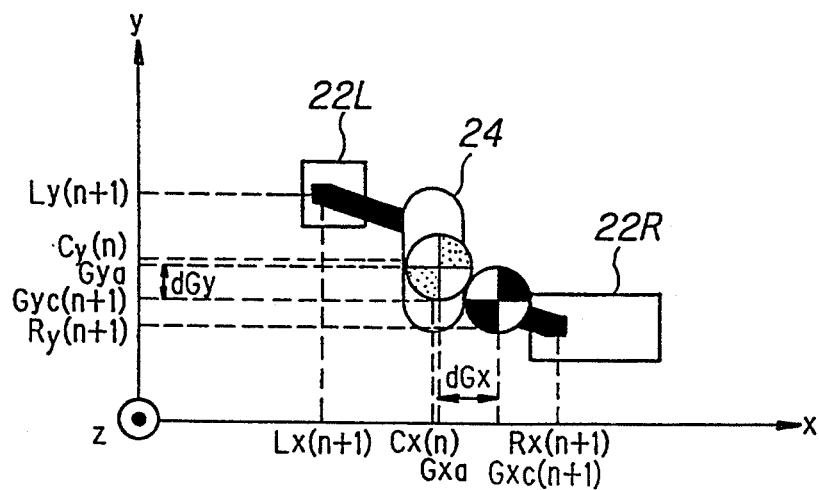
Figure 17:
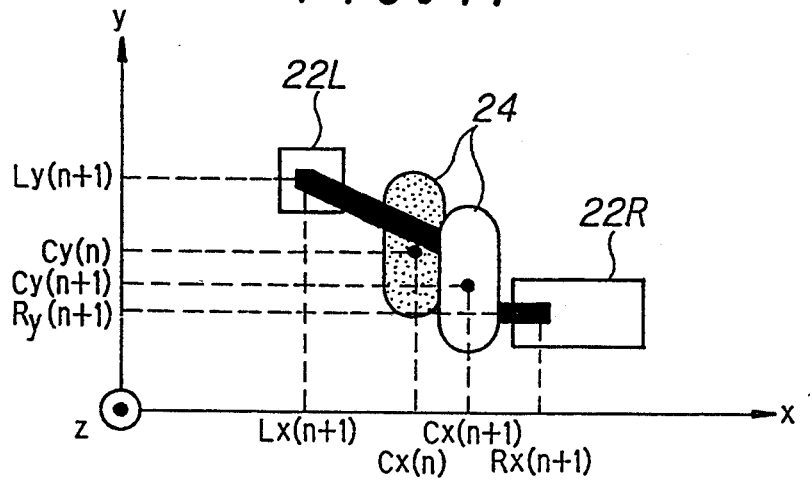

Control next passes to step S24 of the flow chart of FIG. 3, in which the position or location of the center of gravity at current time t(n), i.e. before the hip position has changed, are calculated. Specifically, assuming that the hip position C at the current time is Cx(n), Cy(n) in FIG. 15 and has moved to position Cx(n+1), Cy(n+1) in FIG. 17 at time t(n+1), the center of gravity Gxa, Gya is first calculated with the hip position, which the key factor in attitude determination, in its current position, whereafter control moves to step S26 in which the deviation dGx, dGy between the target center of gravity Gxc(n+1), Cyc(n+1) and the current center of gravity Gxa, Gya is calculated in the manner shown in FIG. 16, and to step S28 in which the calculated deviation is multiplied by prescribed coefficients kx, ky to obtain hip position correction amount dCx, dCy to be moved. The coefficients kx, ky are appropriately set. They may, for example, be made variable with the walking speed, such that kx=0.1, ky=0.9, for example. Control then passes to step S30 in which the movement correction amount dCx, dCy calculated in step S28 is added to the hip position Cx(n), Cy(n) at current time t(n) to obtain the hip position Cx(n+1), Cy(n+1) at the next time t(n+1). Since the hip position constituting the key factor for determining the attitude is determined in this way, the remaining positions (of the feet etc.) can be easily determined from the data defined by the walking pattern, either as it is or after appropriate modification.

Control then passes to step S32 in which the target joint angles (target link angles) are calculated on the basis of the determined attitude, to step S34 in which the target Joint angles are output to the RAM 54, to step S36 in which the time t is updated to t(n+1) by adding delta t, and back to step S12. Insofar as the locomotion has not been terminated, control then passes to step S14 to wait for the next timer interrupt, whereafter operations like those just described are repeated for time t(n+1). When it is found in step S12 that the locomotion has been terminated, control passes to step S38 in which required postprocessing is conducted and the program is terminated.

Figure 18:
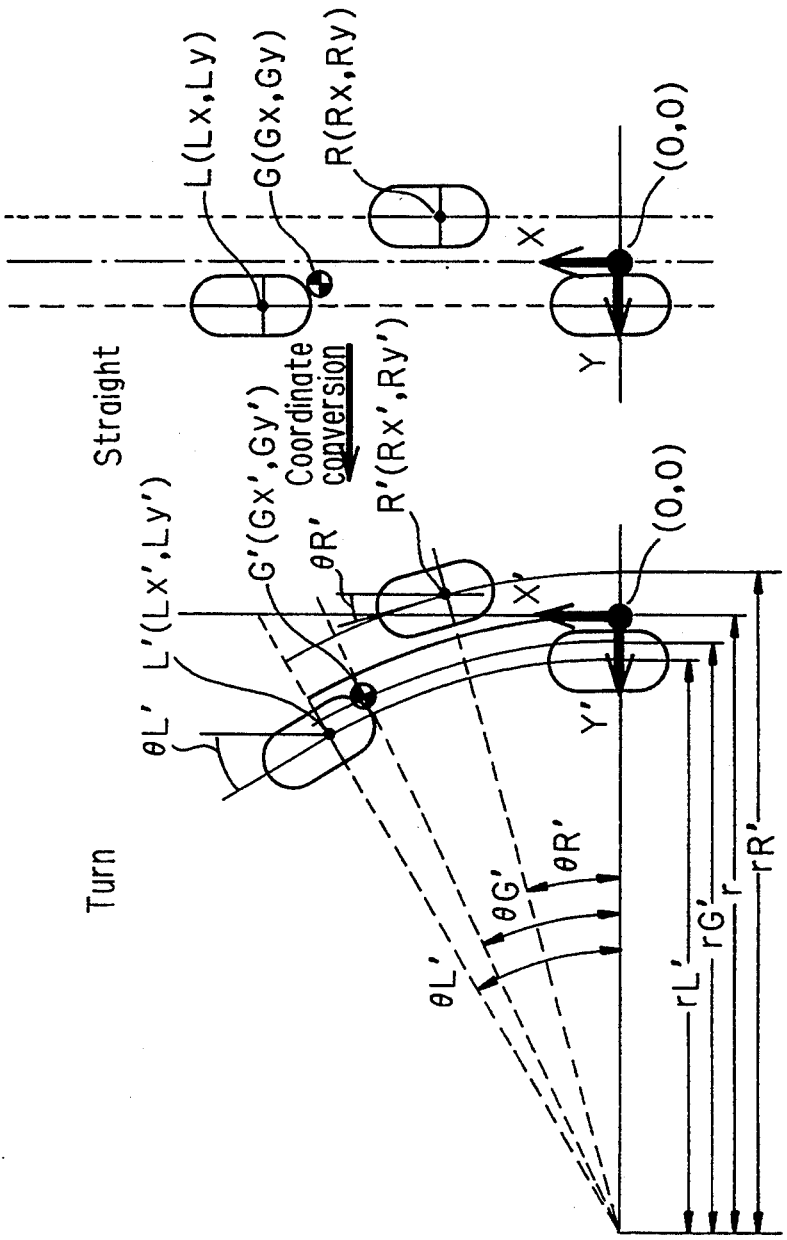
FIG. 18 is an explanatory view showing the robot's turning motion to the left by a radius r after the robot having walked straight.

Assume that a command for modification of the walking pattern is invoked in step S20. In this embodiment, walking pattern modification is conducted by using the joy stick 70 to invoke a command to turn left (right) at a turning radius r, as shown in FIG. 18. When such a command is invoked, the first processor 60 of the microcomputer modifies the read-in walking pattern by conducting coordinate conversions such as shown at the bottom of FIG. 18 (the symbols with primes in this figure indicate the positions after coordinate conversion, i.e. the positions after modification; symbols with primes also indicate coordinateconverted values in the other figures). Control then passes through step S22 and the following steps for calculating the target joint angles (target link angles) in accordance with the modified walking pattern and sending the values to the RAM 54, in the same manner as described above.

Figure 19:
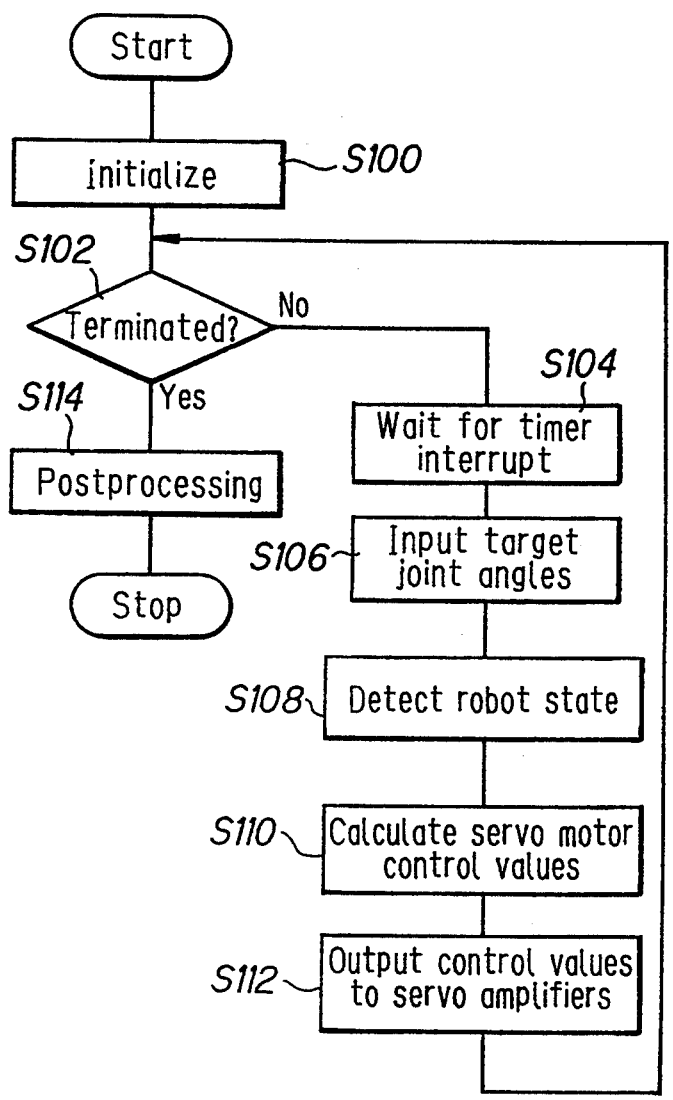
FIG. 19 is a flow chart showing servo motor control based on target joint angles determined in the flow chart of FIG. 3.

The operations conducted by the second processor 62 for determining the servo motor control values on the basis of the target joint angles will now be explained with reference to the flow chart of FIG. 19.

After initialization has been conducted in step S100, control passes to step S102 in which a check is made as to whether or not locomotion has been terminated, and if it has not, to step S104 in which it waits for a timer interrupt. When the timer interrupt occurs, control passes to step S106 in which the target joint angles are read from the RAM 54 and step S108 in which the state of the robot is detected from the outputs of the sensor group. Next, in step S110, the servo control values required for driving the respective joints are calculated from the target joint angles and the detected joint angles (actual measured values). Control then passes to step S112 in which the control values are output to the servo amplifiers through the D/A converter 66. If step S102 finds that locomotion has been discontinued, the required postprocesssihg is conducted in step S114 and the program is terminated.

In this embodiment, if a request be made in the course of walking to change the footfall position by, say, 10 cm, the deviation between the target center of gravity for the new footfall position and the current center of gravity will be calculated, the new attitude will be determined by roughly calculating the correction movement amount of the hip position from the deviation, which is the key parameter in attitude determination, and then calculating the joint angles. Owing to this arrangement, the manner of the robot's walking can be changed at will in the course of its locomotion. Specifically, the center of gravity, footfall position etc. are determined in advance, the appropriate attitude for the walking state is determined and the joint angles are calculated, and the joints are driven on the basis of the calculated angles. More specifically, since the center of gravity, feet positions etc. are defined as walking data in advance on the assumption of straight line walking and the joint angles are calculated in real time in parallel with the determination of the attitude from the walking state, the walking can be modified as desired using only a compact, light-weight computer.

Moreover, since the joint angles are calculated in a simple manner using the illustrated geometric method, the system can be easily realized with a compact, light-weight control unit. Further, since the vertical (z axis) direction is ignored in determining the hip position, attitude determination and joint angle calculation is further simplified. Also, since positioning in terms of absolute coordinates is made possible, the robot attitude angles can be accurately detected, thus ensuring stable walking.

Figure 20:
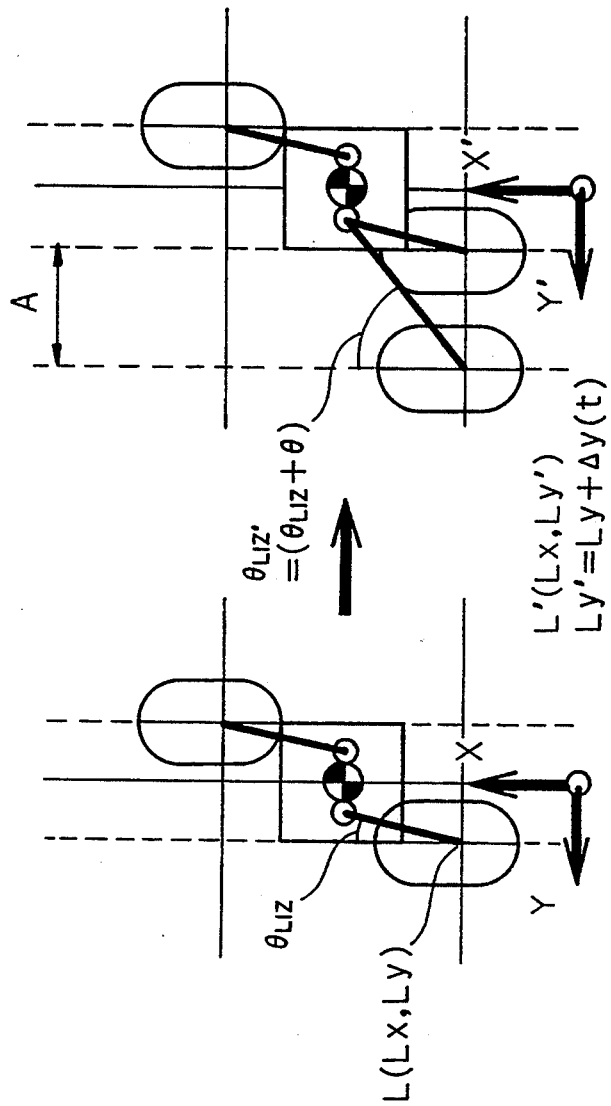
FIG. 20 is an explanatory view showing a second embodiment of the invention.
Figure 21:
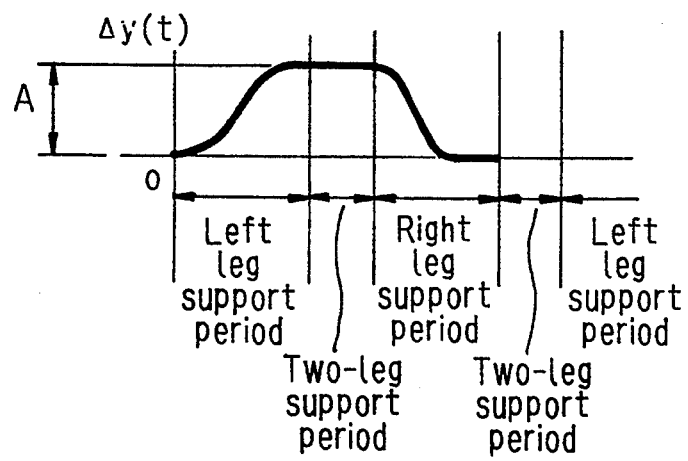
FIG. 21 is an explanatory view showing the characteristics of a unit positional correction amount delta y.
Figure 22:
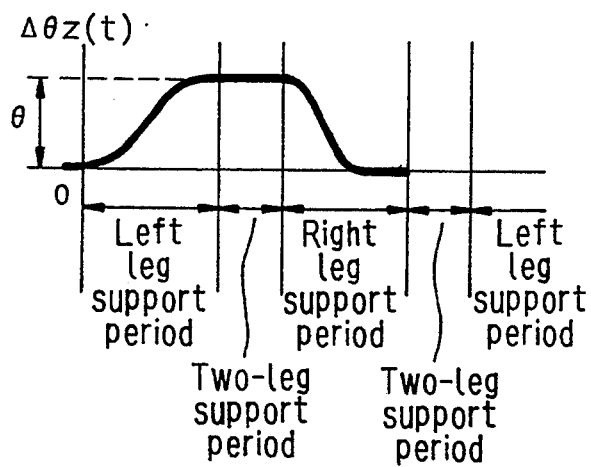
FIG. 22 is an explanatory view showing the characteristics of a unit angular correction amount delta $8\theta$.

FIG. 20 is a diagram for explaining a second embodiment of the invention. (The component of the left side hip joint angle around the z axis designated as Llz in FIG. 10 explained earlier is indicated as $\theta$Llz in FIG. 20.) In this embodiment, the direction of advance is not changed but, as shown in FIG. 20, the position of one leg (the left leg in FIG. 20) is shifted laterally to by a distance A. In the illustrated case, this is achieved by adding a unit positional correction amount delta y to the position Ly of the left foot. More specifically, delta y is given the characteristics shown in FIG. 21 and, with the passage of time from the left leg support period through the two-leg support period to the right leg support period, the angle is gradually modified by a unit angular correction amount delta $\theta$ in accordance with the characteristics of FIG. 22. The positions of the remaining portions are maintained as they are. The characteristics of delta y (delta$\theta$z) in FIG. 21 (FIG. 22) can be defined in advance or be calculated in real time when the manner of walking is changed. Moreover, while the figures show the characteristics to be expressed as cubic functions, they can be expressed as quadratic or other order functions instead.

Figure 23:
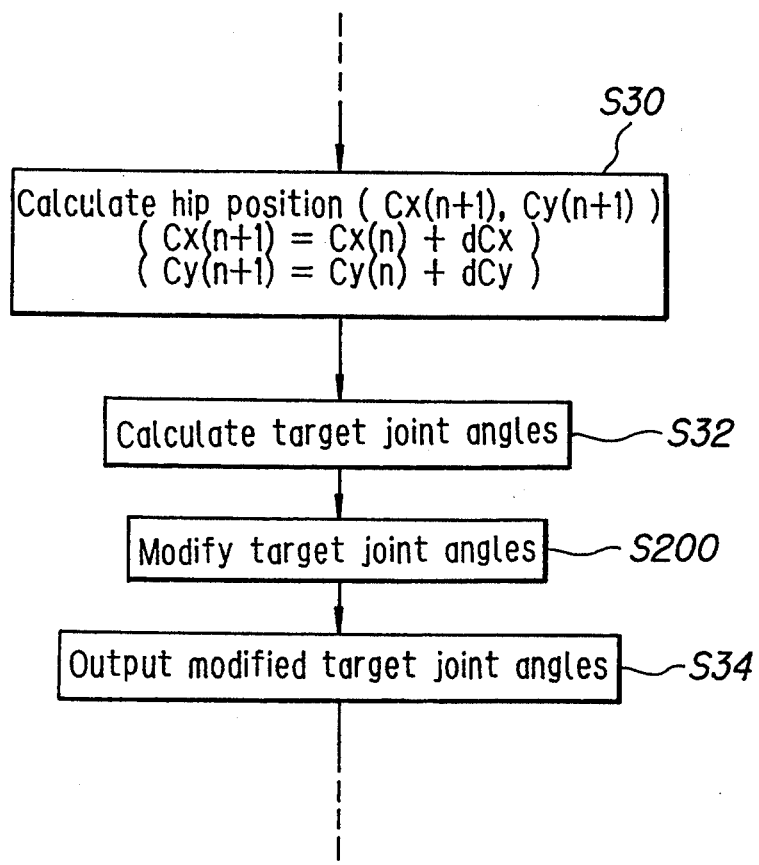
FIG. 23 is a portion of a flow chart, similar to FIG. 3, but showing a third embodiment of the invention.
Figure 24:
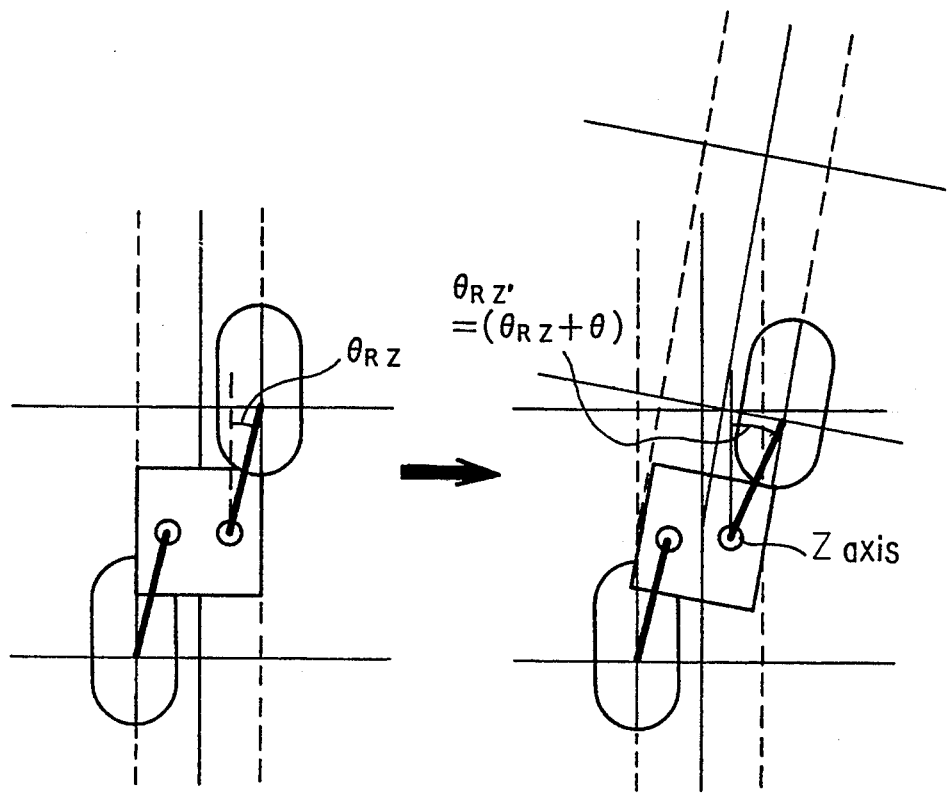
FIG. 24 is an explanatory view showing the robot's turning motion to change its direction of advance.
Figure 25:
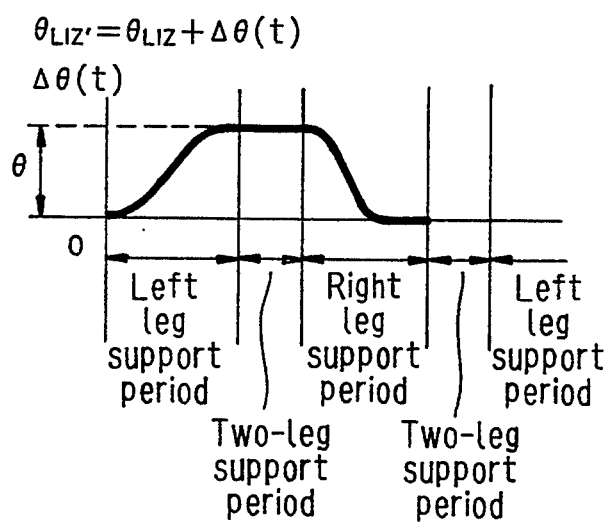
FIG. 25 is an explanatory view showing that the characteristics of a unit angular amount correction amount delta $\theta$.

FIGS. 23 to 25 show a third embodiment of the invention, in which modification is made by use of an angle instead of a position. As indicated by the essential part of the flow chart of this embodiment shown in FIG. 23, step S200 for modifying the target joint angles is inserted after step S32 of the flow chart of FIG. 3. As shown in FIG. 24, in this embodiment the turning direction and angle $\theta$ are input through the joy stick 70 and only the joint 10 (10L in the illustrated example) which turns the leg link on the supporting side is driven by the angle $\theta$ in the indicated direction. As shown, this causes the robot to change its orientation in the designated direction by the angle $\theta$. (In the figure, $\theta$RZ indicates the orientation of the foot before turning and $\theta$RZ' the orientation thereof after turning.) The actual turning is conducted by driving the joint angle of the joint 10L in minute increments of delta $\theta$ over the course of time, in accordance with the characteristics shown in FIG. 25. (As in the case of FIG. 20, the component of the left side hip joint angle around the z axis designated as Llz in FIG. 10 is indicated as $\theta$Llz in FIG. 25.)

In the third embodiment, the joint to be corrected is the joint 10 R(L) alone so that the direction of advance can be changed in an easier manner than the first embodiment. Further, since the joint angle itself is corrected in this embodiment, this will be applied to a case in which the walking pattern is predesigned in terms of the joint angle. Furthermore, the discussion in the second embodiment will also be applied to the characteristics of the delta $\theta$ illustrated in FIG. 25.

Figure 26:
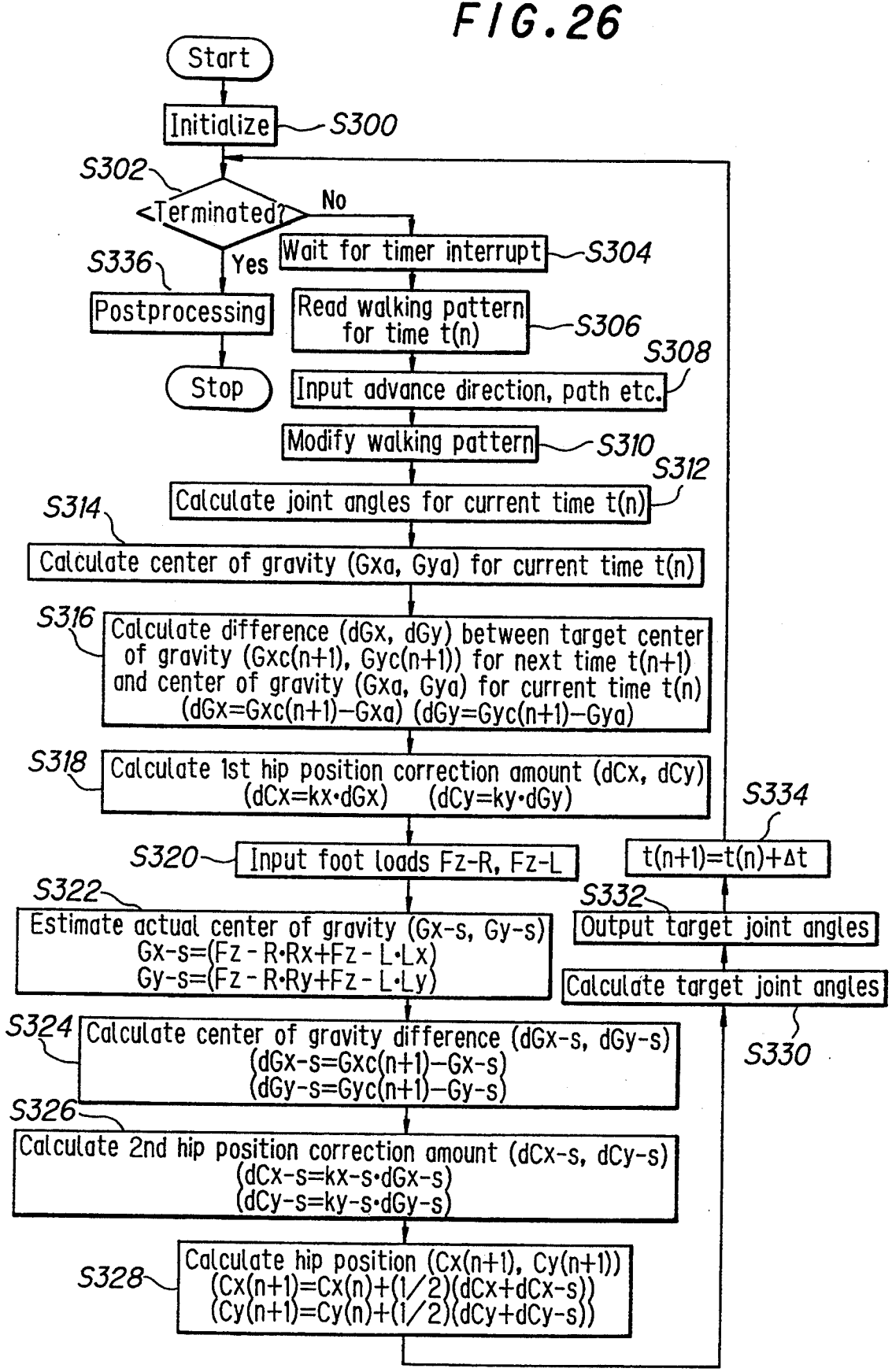
FIG. 26 is a flow chart, similar to FIG. 3, but showing a fourth embodiment of the invention.

FIG. 26 is a flow chart showing a fourth embodiment of the invention, which will be explained mainly in terms of how this embodiment differs from the first embodiment illustrated in FIG. 3.

Figure 27:
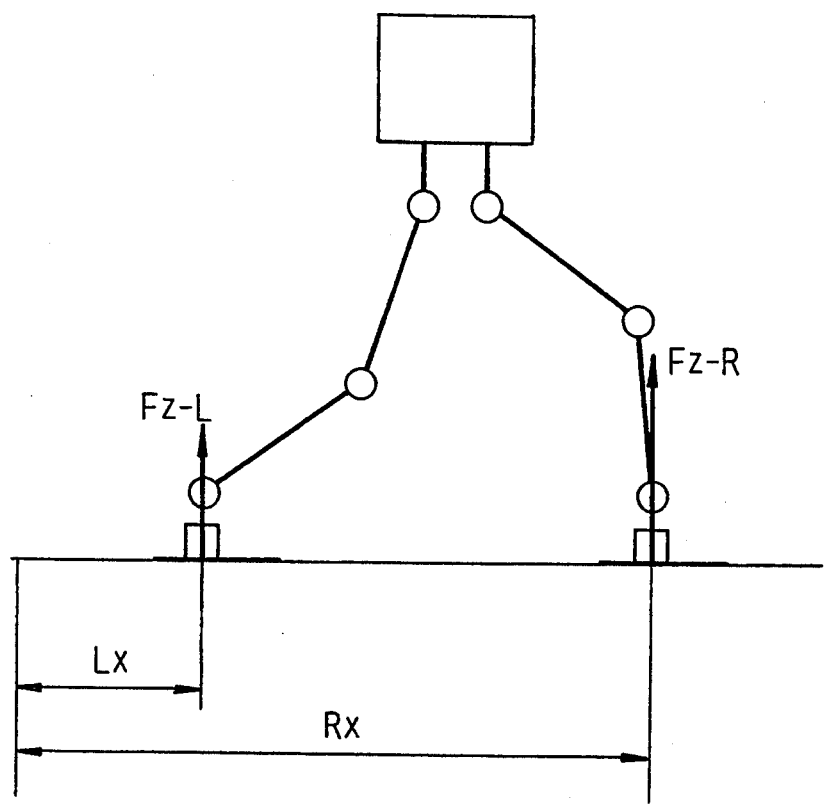
FIG. 27 is an explanatory view showing a ground reaction force acting on the robot as foot loads in which the robot is viewed perpendicular to its advance direction.
Figure 28:
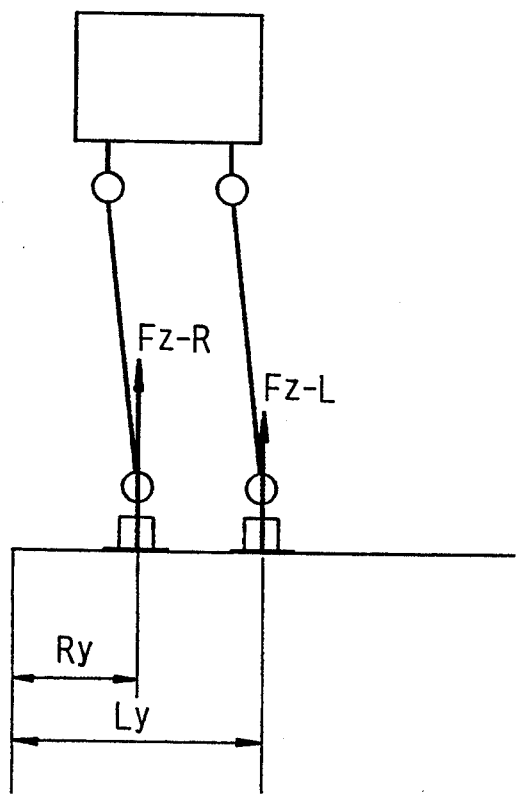
FIG. 28 is an explanatory view, similar to FIG. 27, but showing a case in which the robot is viewed in its advance direction.
Figure 29:
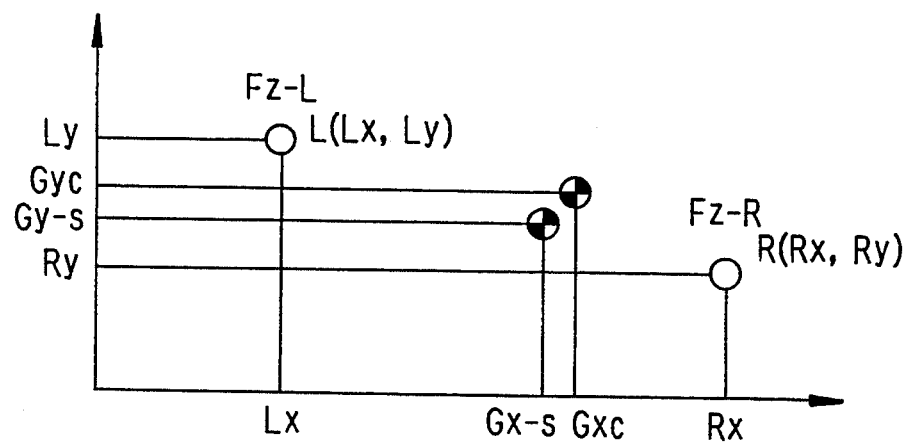
FIG. 29 is an explanatory view showing estimation of actual center of gravity based on the foot loads illustrated in FIGS. 27 and 28.
Figure 30:
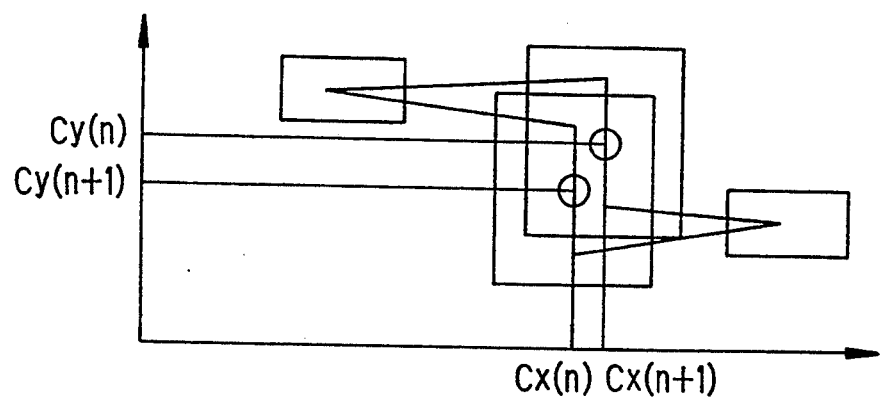
FIG. 30 is an explanatory view showing the relationship between the hip positions at the current time and the next time.

Taking steps S300 to S318 which are identical to steps S10 to S28 in FIG. 3 flow chart of the first embodiment, control then passes to step S320 in which the foot loads Fz—R, Fz—L are input and to step S322 in which the actual center of gravity Gx—s, Gy—s is estimated from the input values. More specifically, as shown in FIG. 27 (view of the robot 1 perpendicular to the advance direction) and FIG. 28 (view of the robot 1 in the direction of advance), a ground reaction force (external force Fz in the z direction) acts on the robot 1. This is the load acting on the center of gravity of the robot 1 and, therefore, if the load is detected, it is possible to estimate the actual center of gravity of the robot 1 from the detected value, as illustrated in FIG. 29. Thus, in step S322, the estimated value Gx−s, Gy−s of the actual center of gravity in the x-y plane is obtained by multiplying the loads acting on the left and right leg links detected by the six-dimensional force and torque sensors 36 by the distances Lx (Rx), Ly(Ry) between a prescribed position and the ground contact points of the left and right leg links. Control then passes to step S324 in which the difference dGx−s, dGy−s between the estimated value and the target center of gravity Gxc(n+1), Gyc(n+1) is calculated and step S326 in which the hip position correction amount dCx−s, dCy−s to be moved is recalculated from the difference by using coefficients kx−s, ky−s (similar to the coefficients used in step S318 (or S28 in FIG. 3)). Next, in step S328, the simple average of the first hip position correction amount dCx, dCy obtained at S318 (=S28 in FIG. 3) and the second correction amount dCx−s, dCy−s obtained in S326 is added to the current hip position Cx(n), Cy(n) to obtain the hip position Cx(n+1), Cy(n+1) for the next time (n+1). (FIG. 30 shows the relationship between the hip positions at the current time and the next time.) Control then passes to step S330 in which the target joint angles are calculated on the basis of the newly determined attitude, to step S332 in which the target joint angles are output to the RAM 54, to step S334 in which the time t is updated to t(n+1) by adding delta t, and back to step S302 similarly as the first embodiment, and then the servo motor control value is likewise determined based on the determined value.

In the fourth embodiment, in addition to the advantages obtained in the earlier embodiments, since the hip position correction amount is calculated as the simple average of the value calculated from the design values (S318) and the value calculated from the actually detected values (S326), any deviation of the actual attitude from the design value owing to disturbance, variation in pay load or the like can be effectively corrected. The hip position can therefore be accurately determined and the target joint angles can be properly calculated. (It is also possible to use a weighted average or the like instead of the simple average.)

Figure 31:
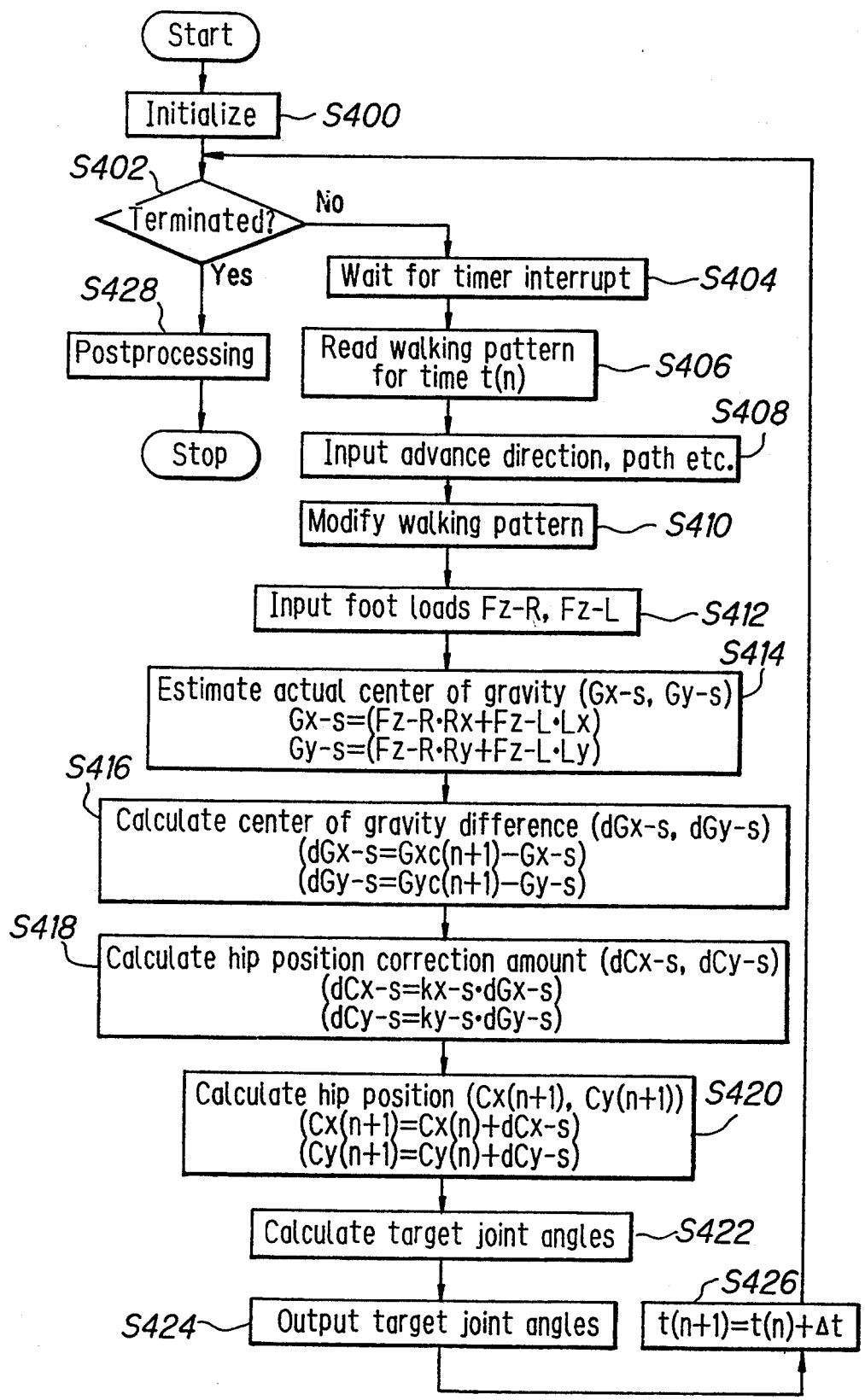
FIG. 31 is a flow chart, similar to FIG. 3, but showing a fifth embodiment of the invention.

FIG. 31 is a flow chart showing a fifth embodiment of the invention, which will be explained only with reference to the points of difference from the first and fourth embodiments. After passing steps from S400 to S410, the foot loads are input in step S412, the center of gravity is estimated in step S414, the difference between the estimated and target center of gravities is calculated in step S416, and, based on the calculated difference, the hip position and the target joint angles are calculated in step S418 and the following steps. In other words, in this embodiment the center of gravity is determined solely on the basis of the detected values and the hip position is corrected therefrom. The configuration including the remaining steps is similar to those of the first or fourth embodiments. Although the processing is simplified, the effect is similar to that of the fourth embodiment.

In the foregoing embodiments, while the position or location of the center of gravity is used in the walking pattern or data, it may alternatively be possible to use a displacement velocity or a displacement acceleration of the robot's center of gravity, solely or in combination, in the walking pattern or data.

While the invention was described with reference to a biped walking robot as an example of a legged robot, the invention can also be applied to legged robots other than the biped one.

Moreover, the present invention has thus been shown and described with reference to the specific embodiments. However, it should be noted that the present invention is in no way limited to the details of the described arrangements, changes and modifications may be made without departing from the scope of the appended claims.

What is claimed is:

1. A system for controlling locomotion of a legged walking robot having a body and a plurality of legs each connected to the body, comprising:
   first means for preestablishing positional walking data in time series with respect to parameters at least including a n-th differential of the robot's center of gravity displacement;
   second means for determining a difference between the n-th differentials of the robot's center of gravity displacement at time t and at time t+delta t defined in the preestablished walking data;
   third means for determining a positional correction amount of the robot body at the time t+delta t in response to the determined difference;
   fourth means for determining an attitude of the robot at the time t+delta t at least on the basis of the corrected position of the robot body;
   fifth means for determining target angles of robot joints on the basis of the determined robot attitude; and
   servo motor means for driving the robot joints in response to the determined target angles.

2. A system for controlling locomotion of a legged walking robot having a body and a plurality of legs each connected to the body, comprising:
   first means for preestablishing positional walking data in time series with respect to parameters at least including a n-th differential of the robot's center of gravity displacement;
   second means for determining a difference between the n-th differentials of the robot's center of gravity displacement at time t and at time t+delta t defined in the preestablished walking data;
   third means for determining a positional correction amount of the robot body at the time t+delta t in response to the determined difference;
   fourth means for determining an attitude of the robot at the time t+delta t at least on the basis of the corrected position of the robot body and one of the parameters defined in the preestablished walking data other than the n-th differential of the robot's center of gravity displacement;
   fifth means for modifying locomotion defined by the preestablished walking data if necessary and for correcting the determined robot attitude in response to the modified locomotion;
   sixth means for determining target angles of robot joints on the basis of the determined or corrected attitude of the robot; and
   servo motor means for driving the robot joints in response to the determined target joint angles.

3. A system according to claim 2, wherein the locomotion defined by the preestablished walking data is a straight walking and said fifth means modifies the locomotion such that the robot turns by a unit angle.

4. A system according to claim 3, wherein said sixth means determines one of the target angles of the joints connecting the robot body to the robot legs.

5. A system according to claim 2, wherein said fifth means modifies the locomotion such that the robot changes its leg position laterally by a unit distance.

6. A system according to claim 2, wherein the robot is a biped walking robot having a body and two articulated legs each connected to the body through a first joint and each having at least a second joint at a position between the first joint and its distal end.

7. A system for controlling locomotion of a legged walking robot having a body and a plurality of legs each connected to the body, comprising:
first means for preestablishing positional walking data in time series with respect to parameters at least including a n-th differential of the robot's center of gravity displacement;
second means for detecting a force or a moment acting on the robot legs to estimate a n-th differential of the robot's center of gravity displacement at time t;
third means for determining a difference between the estimated n-th differential of the robot's center of gravity displacement at the time t and the n-th differential of the robot's center of gravity displacement at time t+delta t defined in the preestablished walking data;
fourth means for determining a positional correction amount of the robot body at the time t+delta t in response to the determined differences;
fifth means for determining an attitude of the robot at the time t+delta t at least on the basis of the corrected position of the robot body;
sixth means for determining target angles of robot joints in response to the determined robot attitude; and
servo motor means for driving the robot joints in response to the determined target joint angles.

8. A system according to claim 7, further including:
seventh means for determining a second difference between the n-th differentials of the robot's center of gravity displacement at time t and at time t+delta t defined in the preestablished walking data;
and said fourth means determines the positional correction amount of the robot body at the time t+delta t in response to the difference determined by the third means and and the difference determined by the seventh means.

9. A system according to claim 7, wherein the robot is a biped walking robot having a body and two articulated legs each connected to the body through a first joint and each having at least a second joint at a position between the first joint and its distal end.

* * * * *